United States Patent
Schnitz et al.

(10) Patent No.: US 7,978,065 B2
(45) Date of Patent: Jul. 12, 2011

(54) DEVICE, SYSTEM AND METHOD FOR TRACKING MOBILE ASSETS

(75) Inventors: Benjamin A. Schnitz, Nashville, TN (US); William R. Cave, Nashville, TN (US); Roland D. Keistler, Jr., Brentwood, TN (US)

(73) Assignee: TrackPoint Systems, LLC, Nashville, TN (US)

( * ) Notice: Subject to any disclaimer, the term of this patent is extended or adjusted under 35 U.S.C. 154(b) by 542 days.

(21) Appl. No.: 11/854,201

(22) Filed: Sep. 12, 2007

(65) Prior Publication Data
US 2008/0061963 A1 Mar. 13, 2008

Related U.S. Application Data

(60) Provisional application No. 60/825,560, filed on Sep. 13, 2006.

(51) Int. Cl.
*G08B 1/08* (2006.01)

(52) U.S. Cl. ......... 340/539.13; 340/426.19; 340/426.22; 340/539.26; 340/572.1; 340/988; 705/22

(58) Field of Classification Search .. 340/539.1–539.26, 340/988, 572.1, 545.6, 539.13, 426.19, 426.22; 705/22, 28
See application file for complete search history.

(56) References Cited

U.S. PATENT DOCUMENTS

| | | | |
|---|---|---|---|
| 4,750,197 A * | 6/1988 | Denekamp et al. | 455/404.2 |
| 5,539,810 A | 7/1996 | Kennedy, III et al. | |
| 5,544,225 A | 8/1996 | Kennedy, III et al. | |
| 5,686,888 A * | 11/1997 | Welles et al. | 340/539.13 |
| 5,917,433 A | 6/1999 | Keillor et al. | |
| 5,999,091 A | 12/1999 | Wortham | |
| 6,166,627 A | 12/2000 | Reeley | |
| 6,484,035 B2 | 11/2002 | Allen, Jr. | |
| 6,687,609 B2 | 2/2004 | Hsiao et al. | |
| 6,762,676 B2 | 7/2004 | Teowee et al. | |
| 6,847,892 B2 | 1/2005 | Zhou et al. | |
| 6,919,803 B2 | 7/2005 | Breed | |
| 6,965,816 B2 | 11/2005 | Walker | |

(Continued)

FOREIGN PATENT DOCUMENTS

| | | |
|---|---|---|
| WO | WO2004022434 | 3/2004 |
| WO | WO2007047359 | 4/2007 |

OTHER PUBLICATIONS

International Searching Authority/US, International Search Report and Written Opinion for PCT/US07/78365, Mar. 14, 2008.

*Primary Examiner* — Brent Swarthout
(74) *Attorney, Agent, or Firm* — Stites & Harbison, PLLC; Jeffrey A. Haeberlin

(57) ABSTRACT

A device attached to an outside surface of a shipping container for tracking the shipping container includes a solar panel, a battery, a GPS receiver module, a cellular data transceiver module, and a microcontroller for controlling the GPS receiver module and the cellular data transceiver module to periodically obtain the location of the shipping container and transmit the location to a tracking database of a central tracking computer. The solar panel, battery, GPS receiver module, cellular data transceiver module and microcontroller are integrated into a one-piece, watertight master control unit. The master control unit may further include a local wireless network master transceiver module. The local wireless network master transceiver module is for communicating with a wireless sensor located within the shipping container through the walls of the shipping container.

8 Claims, 8 Drawing Sheets

U.S. PATENT DOCUMENTS

| | | |
|---|---|---|
| 7,019,683 B2 | 3/2006 | Stevens et al. |
| 7,098,784 B2 * | 8/2006 | Easley et al. ............. 340/539.13 |
| 7,386,372 B2 * | 6/2008 | Breed et al. ........................ 701/1 |
| 7,554,442 B2 * | 6/2009 | Twitchell, Jr. ........... 340/539.26 |
| 7,592,916 B2 * | 9/2009 | Staples ..................... 340/572.1 |
| 2004/0183673 A1 * | 9/2004 | Nageli .................... 340/539.13 |
| 2005/0232747 A1 * | 10/2005 | Brackmann et al. .......... 414/803 |
| 2005/0248444 A1 | 11/2005 | Joao |
| 2005/0273218 A1 | 12/2005 | Breed et al. |
| 2006/0017551 A1 | 1/2006 | Neher et al. |
| 2006/0043090 A1 | 3/2006 | Ferrini |
| 2006/0109106 A1 * | 5/2006 | Braun ..................... 340/539.13 |
| 2006/0117820 A1 | 6/2006 | Lanigan et al. |
| 2006/0164239 A1 * | 7/2006 | Loda ....................... 340/539.22 |
| 2006/0181413 A1 | 8/2006 | Mostov |
| 2006/0212194 A1 | 9/2006 | Breed |
| 2007/0120665 A1 | 5/2007 | Martin et al. |
| 2007/0149184 A1 | 6/2007 | Viegers et al. |

* cited by examiner

DEVICE, SYSTEM AND METHOD FOR TRACKING MOBILE ASSETS

CROSS-REFERENCE TO RELATED APPLICATIONS

This application claims priority to U.S. Provisional Patent Application No. 60/825,560, filed Sep. 13, 2006, the entire disclosure of which is incorporated herein by reference.

STATEMENT REGARDING FEDERALLY SPONSORED RESEARCH OR DEVELOPMENT

Not applicable.

THE NAMES OF THE PARTIES TO A JOINT RESEARCH AGREEMENT

Not applicable.

INCORPORATION-BY-REFERENCE OF MATERIAL SUBMITTED ON A COMPACT DISC

Not applicable.

BACKGROUND OF THE INVENTION

1. Field of the Invention

Generally speaking, the present invention relates to the field of tracking systems. More specifically, an embodiment of the present invention is a system and device that can be used to track mobile assets. These assets can include, for example, semi-trailers, intermodal isotainers, rail cars, and the like.

2. Description of Prior Art

In 2007, there were over 330,000 Department of Transportation registered commercial trucking lines in the United States generating $97.5 billion in annual revenue. Truck trailers are the primary freight delivery equipment asset in the transport of non-containerized freight in the United States. It is estimated that there are between 2.5 million to 3.0 million dry-van trailers in use. Of these, the Federal Motor Carrier Safety Administration (FMCSA) estimates no more that 2% have location reporting technology installed. The high cost of purchasing and installing numerous components on each trailer, and the costs of operating the current systems, has resulted in this low market penetration.

There is a need for an improved system and device for tracking mobile assets as described in more detail below.

SUMMARY OF THE INVENTION

According to an aspect of the invention, a device for attaching to an outside surface of a shipping container for tracking the shipping container includes a solar panel, a battery, a GPS receiver module, a cellular data transceiver module, and a microcontroller. The solar panel is for converting light-energy into electrical power. The battery is for receiving and storing electrical power from the solar panel. The GPS receiver module is for receiving signals from a global positioning system and determining a location of the shipping container. The cellular data transceiver module is for communicating via a cellular data network. The microcontroller is for controlling the GPS receiver module and the cellular data transceiver module to periodically obtain the location of the shipping container from the GPS receiver module, and to transmit the location using the cellular data transceiver module. The solar panel, the battery, the GPS receiver module, the cellular data transceiver module, and the microcontroller are integrated into a master control unit.

The device may further include a local wireless network master transceiver module integrated into the master control unit. The local wireless network master transceiver module has a transceiver for wirelessly communicating with a wireless sensor located within the shipping container through the walls of the shipping container, without any holes through the walls of the shipping container. The microcontroller further controls the local wireless network master transceiver module to periodically obtain data from the wireless sensor, and transmit the data using the cellular data transceiver module.

The device may still further include a battery charging circuit integrated into the master control unit. The battery charging circuit is controlled by the microcontroller for charging the battery with the electrical power from the solar panel.

Still further, the device may include a fuel gauge circuit integrated into the master control unit. The fuel gauge circuit is for communicating a power level of the battery to the microcontroller. When the power level of the battery drops below a first predetermined threshold, the microcontroller turns off the cellular data transceiver module except when the device needs to transmit data. If the power level of the battery further drops below a second predetermined threshold, the microcontroller the turns off the other components of the device, and enters a low-power mode monitoring only the power level of the battery.

The master control unit may further include a baseplate member attached to said solar panel, and an electronics housing sealed to the baseplate member. The electronics housing contains the battery, the GPS receiver module, the cellular data transceiver module, and the microcontroller. The solar panel further includes a solar film having power output contacts. The solar film is positioned on a rigid base sheet. The rigid base sheet is attached to said baseplate member.

According to one implementation, the device includes a Hall-effect sensor in communication with the microcontroller, and a magnet. The baseplate member further includes a recess for receiving the magnet. The microcontroller senses a presence of the magnet via the Hall-effect sensor to turn the device on.

According to another implementation, at least one adhesive member is attached to the bottom surfaces of the baseplate member and the solar panel for attaching the device to an outside surface of the shipping container.

According to another aspect, a system for tracking a shipping container includes a central tracking computer a master control unit attached to an outside surface of the shipping container. The central tracking computer is connected to a tracking database, and is also interfaced to the Internet. The master control unit is attached to an outside surface of the shipping container, and includes a solar panel, a battery, a GPS receiver module and a microcontroller, configured as described above. The location of the shipping container is periodically sent to the central tracking computer through the Internet and a cellular data network.

The shipping container has walls that form a substantially sealed enclosure. The system may further include at least one wireless sensor located within the shipping container for sensing a condition of the shipping container. A local wireless network master transceiver module, as described above, is integrated into the master control unit and is in wireless communication with the wireless sensor located within the shipping container through the walls of the shipping con-tainer without any holes through the walls of the shipping container. Sensor data is periodically sent to the central tracking computer for storage in the tracking database.

The wireless sensor may be paired with the local wireless network master transceiver module, wherein the local wireless network master transceiver module communicates only with the paired wireless sensor.

In one implementation, the shipping container has a forward end and an aft end, and is loaded from the forward end to the aft end. To sense the presence of cargo in the shipping container, a wireless load sensor may be positioned on the inside of the roof proximate the forward end and have a ultrasonic field pointed toward the floor.

Additionally, the shipping container may have at least one door. To detect the opening and closing of the door, a wireless door sensor having a three-axis accelerometer may be mounted to the inside of the door.

Still further, the shipping container may contain at least one piece of cargo having a wireless inventory control tag that transmits shipping information about the cargo.

Better understanding may be had by referring to the following detailed description of exemplary embodiments and drawings.

DESCRIPTION OF EXEMPLARY
EMBODIMENTS OF THE INVENTION

Figure 1:
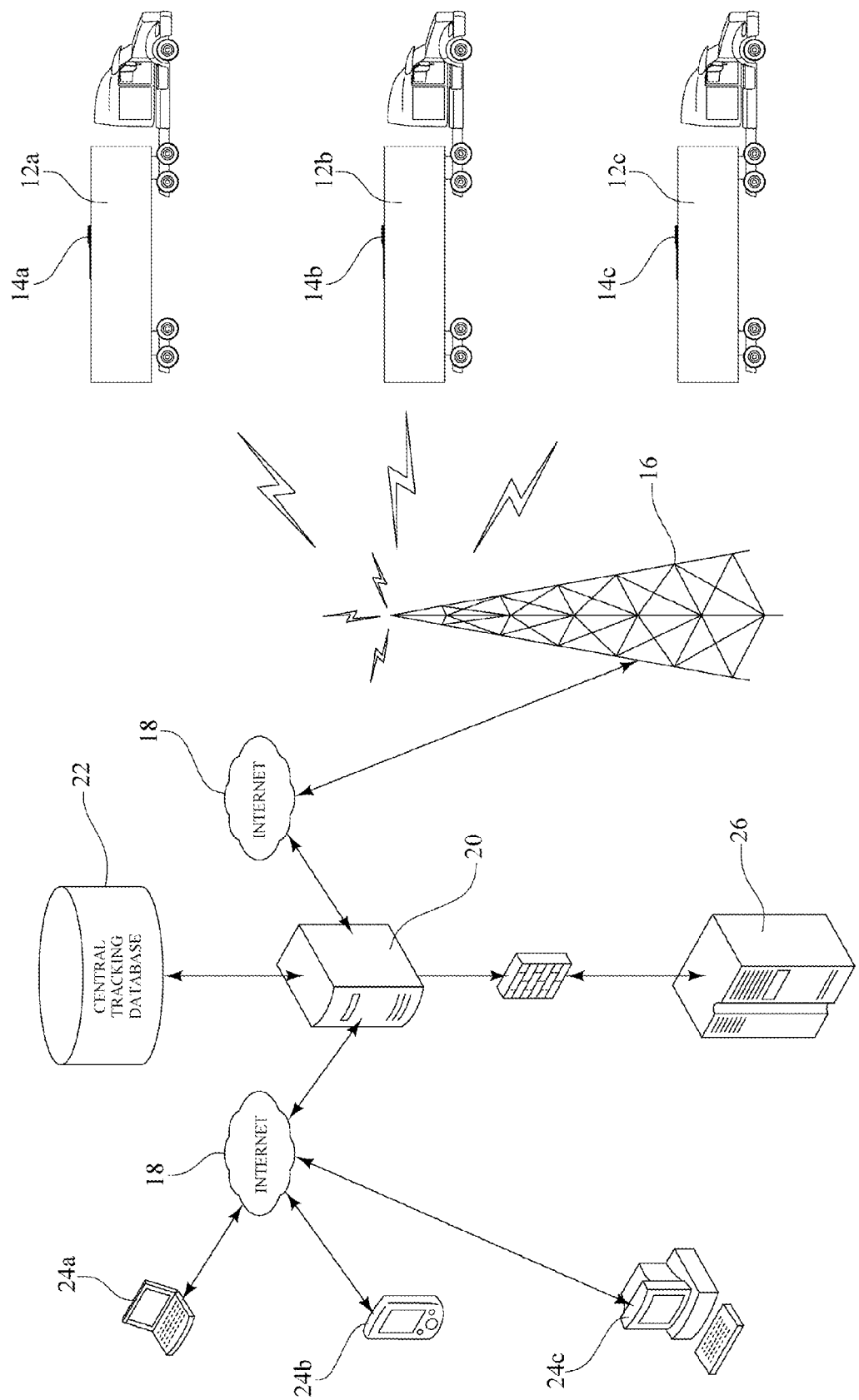
FIG. 1 is a block diagram of an exemplary system for tracking mobile assets according to an aspect of the invention.

FIG. 1 shows a system 10 according to an exemplary embodiment of the invention. The system 10 includes a plurality of shipping containers 12a-12c, master control units 14a-14c attached to respective shipping containers 12a-12c, a cellular data network 16 in communication with each master control unit 14a-14c, the Internet (or an equivalent global data network) 18 in communication with the cellular data network 16, a central tracking computer 20 in communication with the Internet 18, a tracking database 22 in communication with the central tracking computer 20, and various internet-access appliances 24a-24c in communication with the central tracking computer through the Internet 18. Also shown is a backup computer for providing data backup and disaster recovery services for the central tracking computer 20 and the tracking database 22.

The shipping containers 12a-12c are shown as dry-van semi-trailers, but one of skill in the art will recognize that other shipping containers, such as rail cars, intermodal isotainers, fixed trucks, etc., are equivalent containers within the scope of the teachings herein. Each of the shipping containers 12a-12c form a complete enclosure distinctly defining an inside area and an outside area, and contain a wireless sensor (described in detail below) located in the inside area for sensing properties or characteristics of the inside area or the cargo contained therein.

The master control units 14a-14c, which are described in more detail below, each include a microcontroller, a solar panel, a battery and a battery charging module, a cellular data transceiver module, a global positioning system ("GPS") receiver module, and a local wireless network master transceiver module, all in an integral, one-piece, sealed, watertight unit. The master control units 14a-14c periodically collect data regarding the location of the respective shipping container 12a-12c and the properties or characteristics of the inside area or the cargo contained therein from the wireless sensor, and transmit the data to the tracking database 22 of the central tracking computer 20 via the cellular data network 16 and the Internet 18.

The cellular data network 16 is preferably a GSM cellular network, which receives data transmissions from the cellular data transceiver module of the master control units 14a-14c and communicates the data transmissions onto the Internet 18. Additionally, the cellular data network 16 is utilized to transmit updates to software programs that reside in the master control units 14a-14c for operation and control of the master control units 14a-14c. Still further, requests for immediate data reporting from the master control units 14a-14c can be transmitted to the master control units 14a-14c through the cellular data network 16, rather than waiting for the master control units 14a-14c to periodically collect the data and transmit the data to the tracking database 22.

The Internet 18 (or an equivalent global data network) receives the data transmissions from the cellular data network 16 and delivers them to the central tracking computer 20 in a manner that is known in the art.

The central tracking computer 20 receives the data transmissions from the Internet 18, saves the data to the tracking database 22, and also serves as a secure gateway for reports generated from the data in the tracking database 22 from the various internet-access appliances 24a-24c.

The various internet-access appliances 24a-24c, for example, are a laptop computer 24a, a personal digital assistant (PDA)-type device 24b, and a desktop computer 24c that access the central tracking computer 20 through the Internet 18 to obtain the reports generated from the data in the tracking database 22.

Figure 2:
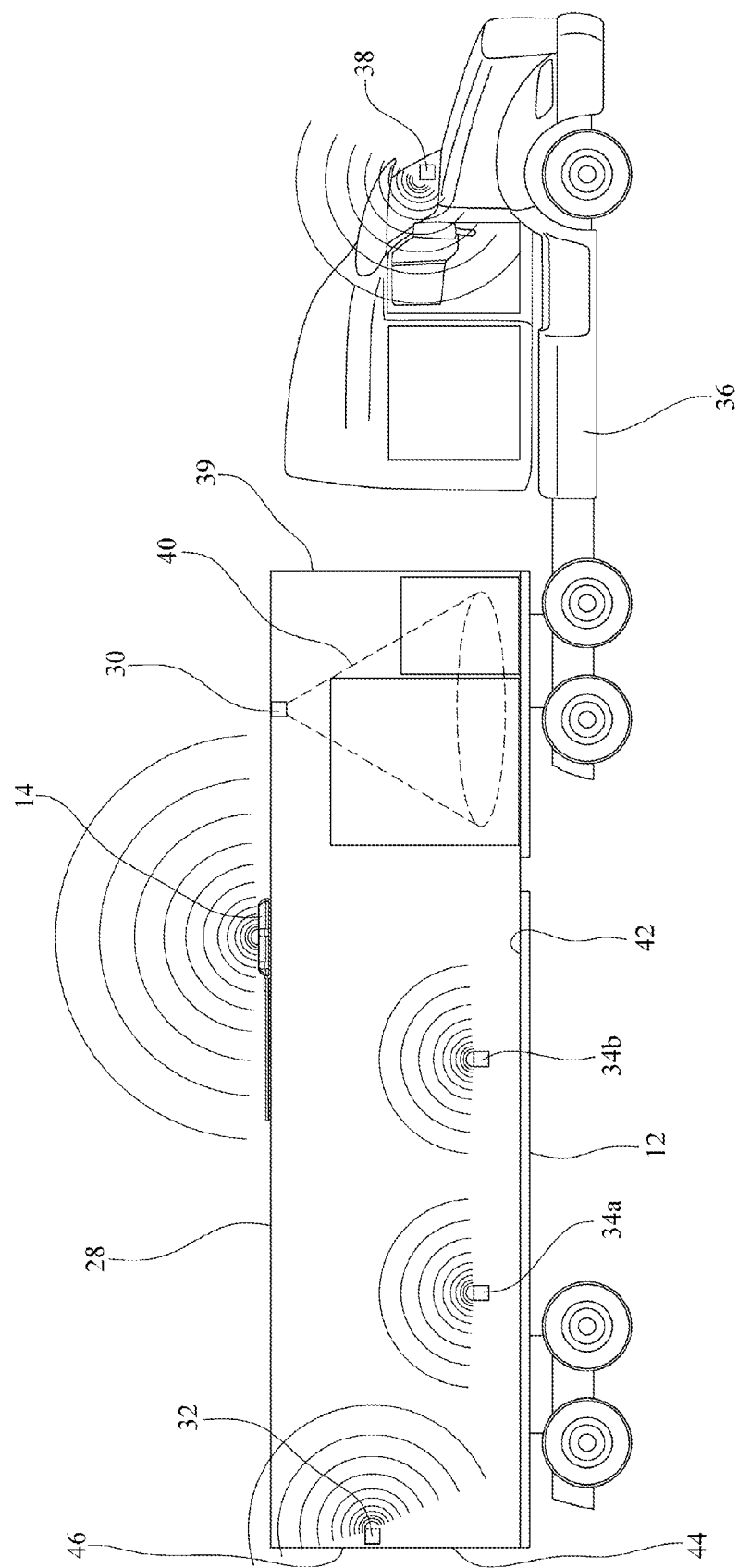
FIG. 2 is a functional illustration of a master control unit device for tracking mobile assets attached to the outside of a roof of a dry-van semi-trailer shipping container, and various wireless sensors, according to an aspect of the invention.

FIG. 2 shows an exemplary configuration of a master control unit 14 attached to the outside of the roof wall 28 a dry-van semi-trailer shipping container 12. The shipping container 12 is characterized in that the shipping container 12 has walls that form a substantially sealed enclosure and has at least one door. Wireless sensors, such as an ultrasonic load sensor 30, three-axis accelerometer door sensor 32, and inventory control tags 34a, 34b are present in the inside area of the shipping container 12, and are in wireless communication with the local wireless network master transceiver module (described below) of the master control unit 14. Also shown is a road tractor 36 coupled to the shipping container 12, and a wireless "panic button" transmitter 38 located in a cab area of the road tractor 36, and also in wireless communication with the local wireless network master transceiver module of the master control unit 14. One of skill in the art will recognize that additional wireless sensors for detecting or measuring other properties or characteristics of the inside area or the cargo contained within the shipping container 12 are within the spirit and the scope of the claims that follow this description.

The local wireless network master transceiver module of the master control unit 14 comprises the master node in a local wireless network with the wireless sensors. An exemplary wireless network uses the hardware specified by IEEE standard 802.15.4 coupled with a proprietary communication protocol. The local wireless network allows sensor data from wireless sensors in the network to be gathered by the master control unit 14 and transmitted using the cellular data transceiver module of the master control unit 14.

Particular wireless sensors are paired with a particular master control unit 14 to prevent crossing signals between multiple shipping containers that may be in wireless sensor transmission proximity to each other (i.e. shipping containers "parked" next to each other). This may be done at the factory before the master control unit 14 and associated wireless sensors are delivered, or it may be done in the field if, for example, a wireless sensor is replaced. For instance, when a sensor first boots up it sends a message out requesting for master control unit 14 with which to pair. If a master control unit 14 is present, the master control unit 14 issues an encrypted challenge to the wireless sensor. The wireless sensor must decrypt the challenge, re-encrypt it with a second key, and then send it back to the master control unit 14. If that is successful, the master control unit 14 presents its network ID to the wireless sensor and they are then paired. From this point on, a master control unit 14 will only acknowledge messages from the paired wireless sensor.

The ultrasonic load sensor 30 is preferably a single, self-contained device comprising a replaceable battery, a microcontroller, a local wireless network transceiver, and components for transmitting an ultrasonic beam and receiving the reflections of that beam. Also, preferably the ultrasonic load sensor 30 is packaged in a single enclosure and mounted directly along a center line and about four feet from the forward end 39 on the inside of the roof 28 of the shipping container 12. The load sensor 30 is preferably attached using a double-sided foam tape, such as 3M™ brand VHB tape. An ultrasound beam 40 of the ultrasonic load sensor 30 points down towards the floor 42 of the shipping container 12. If cargo is present in the area of the ultrasonic field 40, the cargo will interrupt the ultrasound field 40 before it gets to the floor wall 42. It is assumed that the shipping container 12 is loaded from the forward end 39 to the aft end 44, and then unloaded from the aft end 44 to the forward end 39. Thus, if the shipping container is loaded with cargo and then it is unloaded, by the time forward end 39 is unloaded, the aft end will also be unloaded. Further, if the forward end 39 is empty, the aft end must also be empty. In this manner, only one set of low-power ultrasound transceivers is required to deduce the load status of the entire shipping container, in contrast to other, prior art configurations that utilize multiple sets of ultrasonic transceivers with multiple beam angles, power levels, and sampling comparisons to determine whether or not a shipping container 12 is loaded. The local wireless network transceiver of the ultrasonic load sensor 30 communicates wirelessly with the local wireless network master transceiver module of the master control unit 34 through the roof 28 of the shipping container 12 without requiring any holes or other penetrations through the shipping container 12.

The door sensor 32 is preferably a single, self-contained device comprising a replaceable battery, a microcontroller, a local wireless network transceiver, and a 3-axis accelerometer. The accelerometer enables the device to detect movement in any of the three major axes (X, Y, and Z). The door sensor 32 is preferably mounted to the inside of a door 46 of the shipping container in order to detect the opening and closing of the door. The three axis accelerometer allows detection of opening of both swinging doors and roll-up doors. The local wireless network transceiver of the door sensor 32 communicates wirelessly with the local wireless network master transceiver module of the master control unit 34 through the roof 28 of the shipping container 12 without requiring any holes or other penetrations through the shipping container 12.

The inventory control tags 34a, 34b are located on at least one piece of cargo and are preferably also single, self-contained devices comprising replaceable battery, a microcontroller, and a local wireless network transceiver. The inventory control tags 34a, 34b may also include a memory containing shipping information, bill of laden information, date of transport information, and the like. The local wireless network transceiver of the respective inventory control tags 34a, 34b communicates with the local wireless network master transceiver module of the master control unit 14 through the roof 28 of the shipping container 12 without requiring any holes or other penetrations through the shipping container 12.

The "panic button" transmitter 38 communicates with the local wireless network master transceiver module of the master control unit 34 to indicate a driver-initiated emergency transmission.

Figure 3:
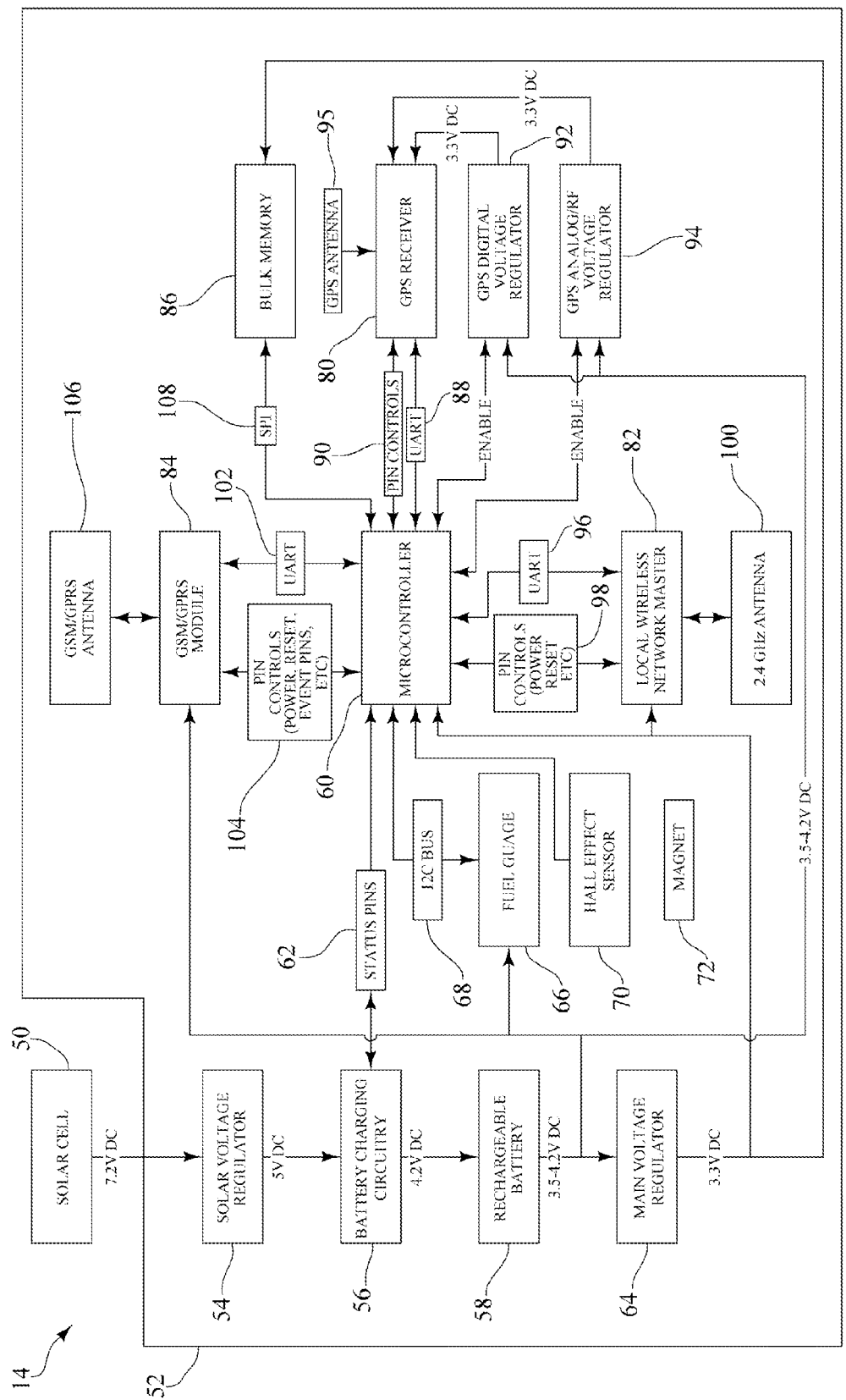
FIG. 3 is a functional block diagram of an exemplary master control unit according to an aspect of the invention.
Figure 4:
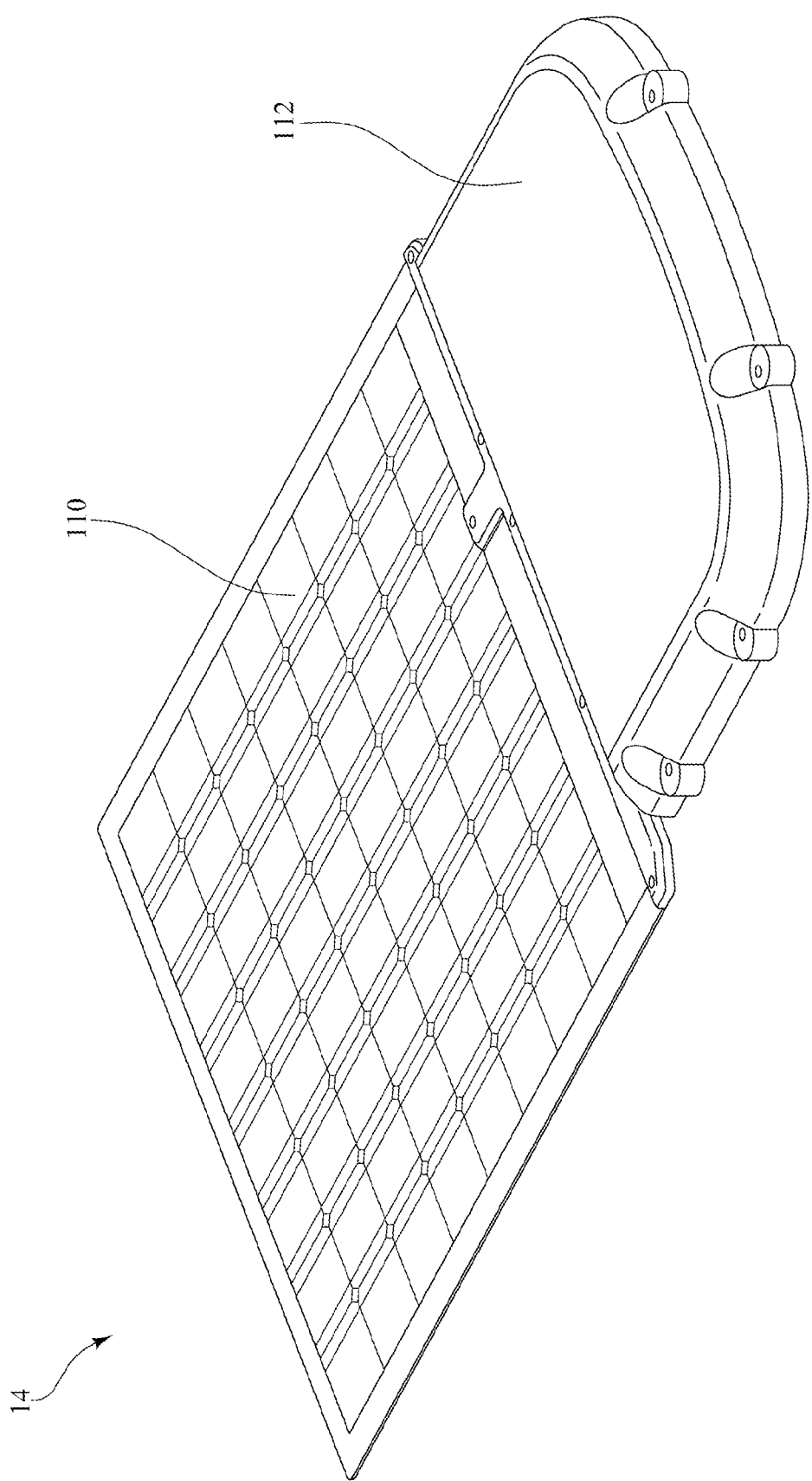
FIG. 4 is a perspective view of an exemplary master control unit according to an aspect of the invention.
Figure 5:
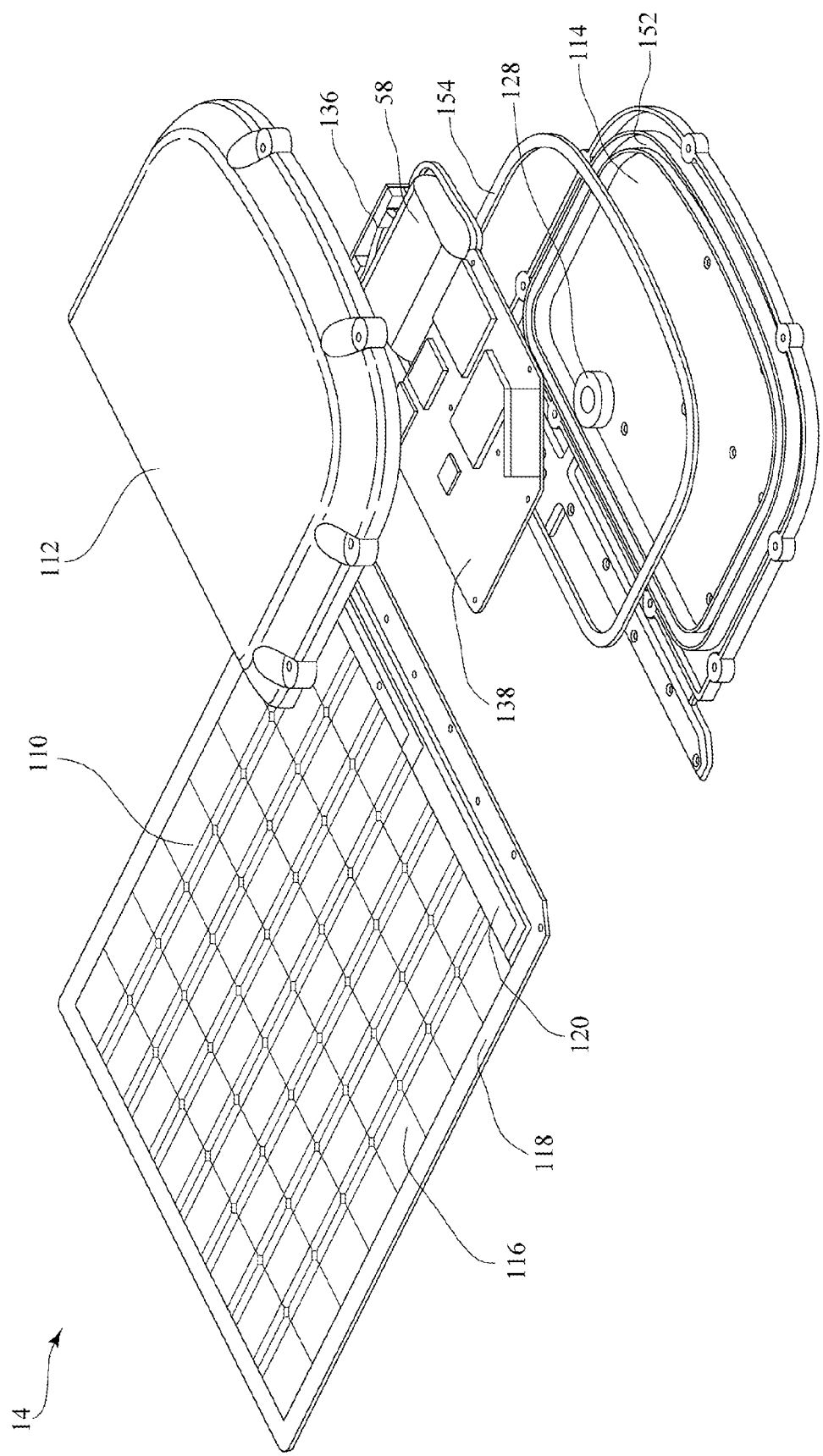
FIG. 5 is an exploded perspective view of the exemplary master control unit of FIG. 4.

FIG. 3 is a block diagram of an exemplary master control unit 14 including solar cells 50 and an electronics module 52, which are integrated into a one-piece unit as described below. The solar cells 50 converts light energy, such as from the sun, into power for operation of the electronics module 52.

Preferably, the solar cells 50 provides electrical power to a solar voltage regulator 54, which steps down the voltage for a pulse-charge battery charging circuit 56. The pulse-charge battery charging circuit 56 charges a battery 58. The solar cells 50 are inherently a current-limited source, because the instantaneous current output of the solar cells 50 differs greatly depending on cloud cover, angle of the sun, etc. A traditional linear charger does not work well because when the current output of the solar cells 50 decreases (for example if a cloud obscures the sun), then the linear charger will "drop out," meaning it will stop the charging thinking the power source was removed. As a result the charging process would continually start and stop, and never finish properly. The pulse-charge battery charging circuit 56 is able to compensate for varying instantaneous current levels because the pulse charge circuit delivers the charge current in "packets" rather than linearly. Thus, if the source becomes current-limited, the pulse-charge battery charging circuit 56 will store up enough power until it can deliver a packet of current. The result is that even in cloudy weather the pulse-charge battery charging circuit 56 charges without dropping out, even though it is less efficient than in sunny weather. The pulse-charge battery charging circuit 56 communicates its charging status to a microcontroller 60 using status pins 62, and the microcontroller 60 controls the pulse-charge battery charging circuit 56 via the status pins 62.

The battery 58 preferably utilizes lithium-ion chemistry, due to the high charge density and high number of recharge cycles of lithium-ion batteries. However, it is not intended that the claims be limited to any particular rechargeable battery chemistry. The battery 58 provides power, either directly or through a main voltage regulator 64, to the components of the electronics module 52 described below.

A fuel gauge circuit 66 is powered by and monitors the power level of the battery 58. The fuel gauge circuit 66 communicates the power level of the battery 58 to the microcontroller 60 using an I2C bus 68.

The microcontroller 60 uses the information about the power level of the battery 58 and the charging status of the pulse-charge battery charging circuit 56 to manage power usage if the master control unit 14 is shielded from the sun for an extended period, as described in more detail below.

Additionally, to preserve the integral, sealed characteristic of the master control unit 14, a Hall-effect sensor 70 is included for functioning as an on/off switch. As will be discussed below, a housing of the master control unit 14 is provided with a recess for receiving a magnet 72. When placed in the recess, the magnet 72 is aligned with the Hall-effect sensor 70, which is located on the inside of the housing. When the magnet 72 is not in the recess, only the Hall-effect sensor and the microcontroller 60 are running, and the microcontroller is running is a super-low power mode. When the magnet 72 is placed in the recess, typically at installation of the master control unit 14 at a customer site, the microcontroller 60 senses the presence of the magnet 72 via the Hall-effect sensor 70, and the microcontroller 60 turns the other components of the electronics module 52 "on" for operation.

The electronics module 52 includes a GPS receiver module 80, a local wireless network master transceiver module 82, a cellular data transceiver module 84, and a bulk memory module 86. The microcontroller 60 uses proprietary firmware to control all functions of the electronics module.

The GPS receiver module 80 is interfaced to the microcontroller 60 over a GPS serial Universal Asynchronous Receiver/Transmitter (UART) 88 and through GPS pin controls 90. Additionally, power for a digital portion of the GPS receiver module 80 is supplied by a GPS digital voltage regulator 92, and power for an analog/RF portion of the GPS receiver module 80 is supplied by a GPS analog/RF voltage regulator 94. The GPS digital voltage regulator 92 and the GPS analog/RF voltage regulator 94 are supplied directly by the rechargeable battery 58, and enabled or disabled by the microcontroller 60, thereby providing and removing power as desired. The microcontroller 60 also communicates with the GPS receiver module 80 over the GPS UART 88 for instructing the GPS receiver module 80 to enter different modes, such as low-power or active modes, or to configure the GPS receiver module 80 to output messages in a desired format. The GPS receiver module 80 collects radiofrequency Global Positioning System data from a passive GPS antenna 95, and converts the data to a digital format for transmission to the microcontroller 60 over the GPS UART 88. An active GPS antenna could be used, but because the GPS receiver module 80 and the passive GPS antenna 95 are in the same package and physically close to each other, the passive antenna 95 is adequate, providing lower cost and power benefits.

The local wireless network master transceiver module 82 is interfaced to the microcontroller 60 over a local wireless network master UART 96 and through local wireless network master pin controls 98. The local wireless network master transceiver module 82 is powered by the main voltage regulator 64. The local wireless network master transceiver module 82 communicates wirelessly through a 2.4 GHz antenna 100 to wireless sensors, such as discussed above with respect to FIG. 2. The 2.4 GHz antenna 100 is soldered onto a circuit board with the local wireless network master transceiver module 82. Alternately, the 2.4 GHz antenna 100 can be attached to the circuit board through several methods, including being printed onto the circuit board. The microcontroller 60 and the local wireless network master transceiver module 82 communicate data to and from the wireless sensors via the local wireless network master UART 96. Additionally, the microcontroller 60 communicates commands and instructions via the local wireless network master UART 96 that change the mode or function of the local wireless network master transceiver module 82. The microcontroller 60 controls power and reset functions of the via the local wireless network master transceiver module 82 via the local wireless network master pin controls 98. Preferably, the local wireless network master transceiver module 82 should utilize a low-noise amplifier on a receive side, and a power amplifier on a transmit side to aid in communicating with the wireless sensors through the skin of the shipping container 12 (FIG. 2) without any holes or other penetrations through the shipping container 12.

Advantageously, the local wireless network master UART 96 and the GPS UART 88 may be the same UART channel, with the microcontroller 60 controlling a dual SPDT IC switch (one switch for RX and the other switch for TX) to switch the destination as necessary.

The cellular data transceiver module 84 is interfaced to the microcontroller 60 over a cellular data transceiver UART 102 and through cellular data transceiver pin controls 104. The cellular data transceiver module 84 is powered directly by the rechargeable battery 58. The microcontroller controls the cellular data transceiver module 84 by issuing and receiving data over the cellular data transceiver UART 102, and by using the cellular data transceiver pin controls 104 to control power and reset functions. The cellular data transceiver module 84 is used to transmit data out of the master control unit 14 to an end user over the Internet 18, and to receive data from an end user over the Internet 18. The cellular data transceiver module 84 takes digital data from the microcontroller 60 and converts it to radiofrequency waves, which are transmitted using an integral GSM/GPRS antenna 106. Similarly, radiofrequency waves captured by the GSM/GPRS antenna 106 are transmitted to the cellular data transceiver module 84, which converts the waves to digital data for communication to the microcontroller 60.

The bulk memory module 86 is interfaced to the microcontroller 60 over a serial peripheral interface (SPI) 108, and is powered by the main voltage regulator 64. The bulk memory module 86 is used to store GPS or other operational data, and to store microcontroller program memory for bootloading applications.

Figure 6:
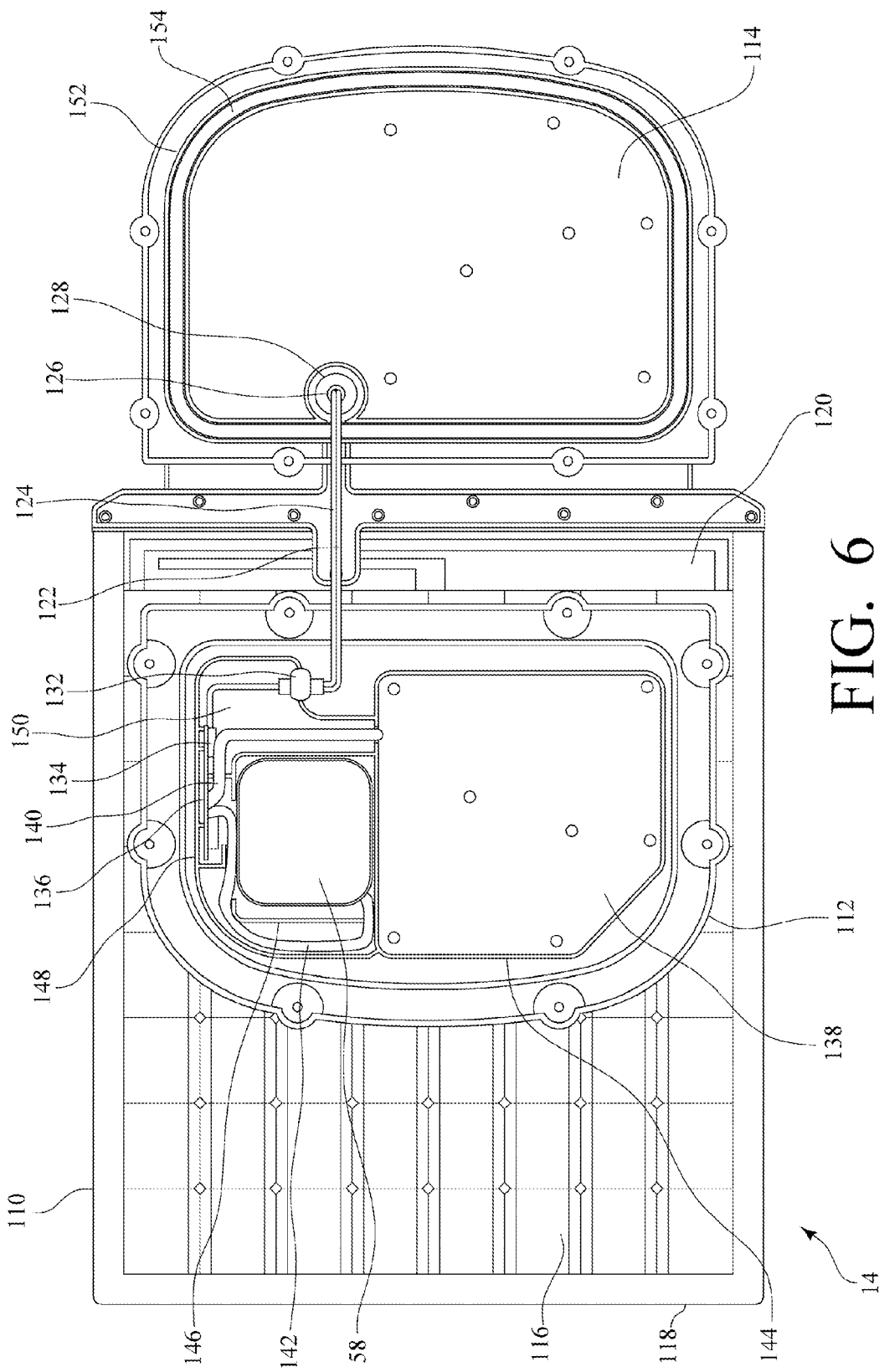
FIG. 6 is top view of the exemplary master control unit of FIG. 4, wherein an electronics housing is folded back over a solar panel, exposing an underside of the electronics housing and a baseplate member.
Figure 7:
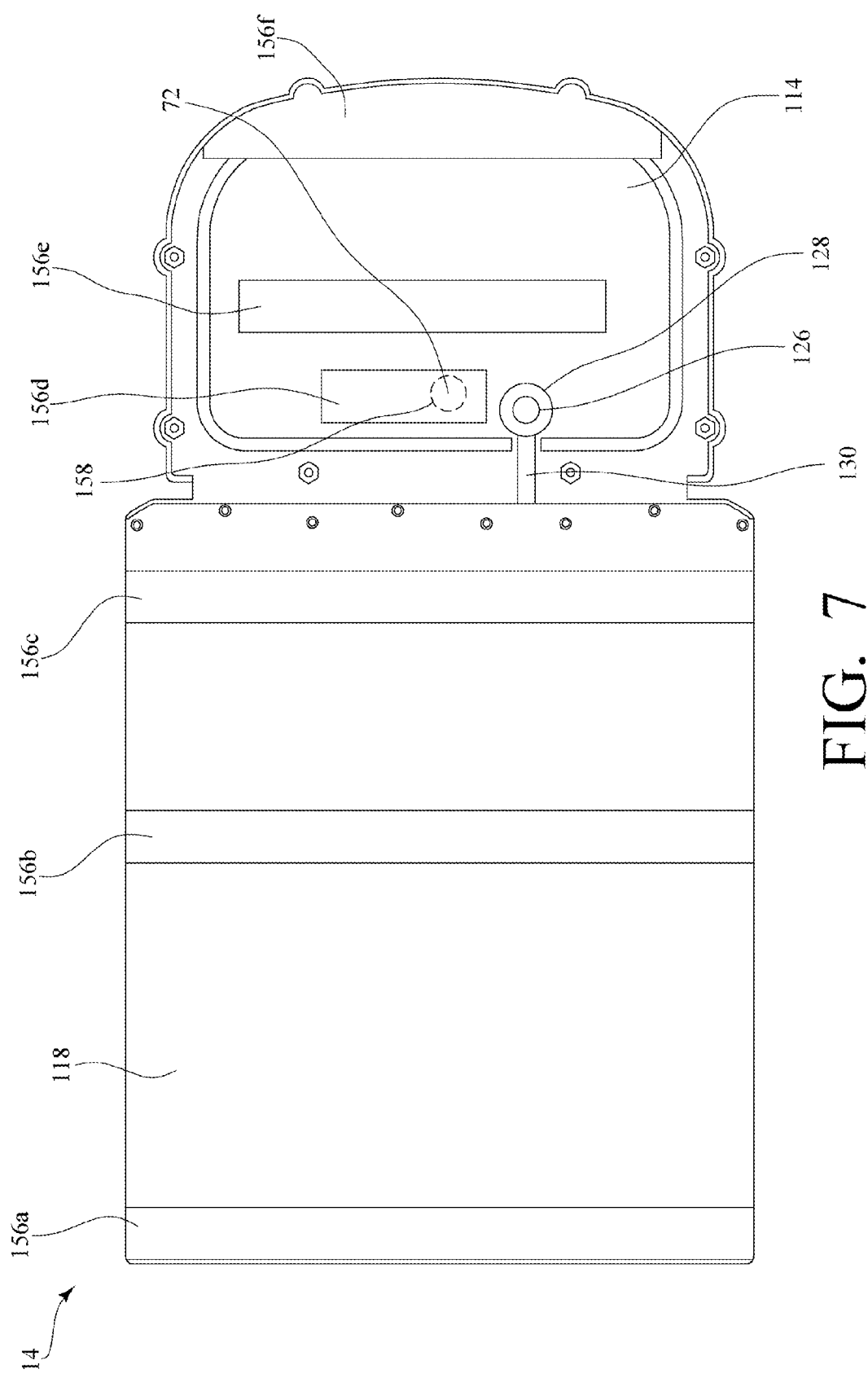
FIG. 7 is a bottom view of the exemplary master control unit of FIG. 4.
Figure 8:
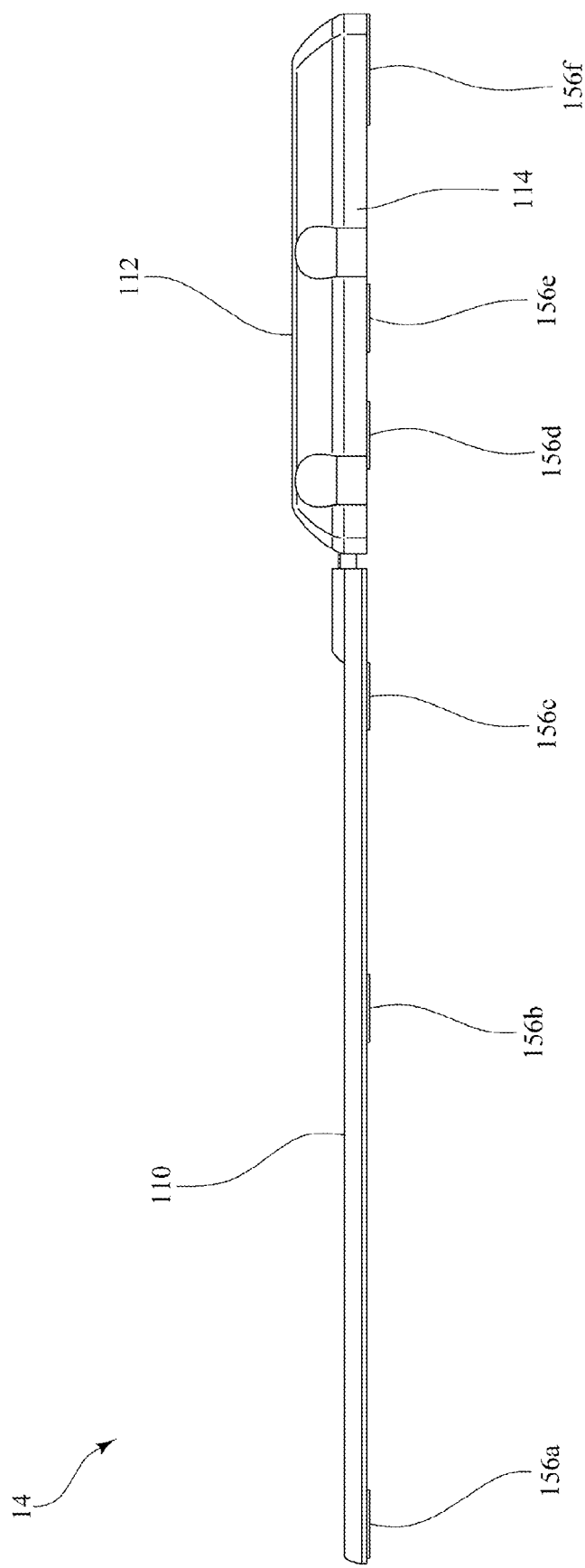
FIG. 8 is a side view of the exemplary master control unit of FIG. 4.

FIG. 4 through FIG. 8 show an exemplary master control unit 14, including a solar panel 110 and an electronics housing 112. The solar panel 110 contains the solar cells 50 (FIG. 3) and the electronics housing 112 houses the components of the electronics module 52 (FIG. 3). FIG. 6 shows the exemplary master control unit 14, where the electronics housing 112 is folded back onto the solar panel 110, exposing the underside of the electronics housing 112 and a baseplate member 114.

The solar panel 110 includes a solar film 116 placed on a rigid base sheet 118 made of a durable material, such as aluminum. The solar film 116 has power output contacts (not shown). A circuit board 120 is placed on the base sheet picking up the V+ and V− from the power output contacts of the solar film 116. Two wires 122, 124 electrically connect to the power output contacts and are soldered onto the circuit board. The solar film 116, base sheet 118, circuit board 120 and about one inch of the wires 122, 124 are then covered with weatherproof and UV stable Teflon-based coating using a process that uses heat and pressure to adhere the coating.

The baseplate member 114 is preferably injection molded using a black UV-resistant ABS plastic. A watertight first grommet 126, preferably made of a rubber material, is received in a molded recess 128 in the baseplate member 114.

The two wires 122, 124 from the solar panel 110 are led through a channel 130 on the underside of the baseplate member 114. The two wires 122, 124 are then inserted through the first grommet 126. A small, round, second grommet 132 is inserted over the two wires 122, 124 and slid down about halfway down the wires 122, 124. A locking connector 134 is attached to the free end of the two wires 122, 124 so they can later plug into a battery PCB 136. The baseplate member 114 is riveted to the base sheet 118 of the solar panel 110, preferably using an Arbor press. The channel 130 containing the wires 122, 124 and the recess 128 with the first grommet 126 are then filled with a waterproof sealant, which is preferably a silicone material.

The electronics housing 112 is also preferably injection molded using a black UV-resistant ABS plastic. The electronics housing 112 houses the battery PCB 136, a main PCB 138, a cable assembly 140, the battery 58 and battery leads 142. The electronics housing 112 has a main PCB compartment 144 including mounting standoffs (not shown), a battery compartment 146, a molded battery PCB frame 148, and a cable way 150 for the wiring.

The main PCB 138 is inserted into the electronics housing 112 upside down and attached to the electronics housing 112 by fasteners, such as sheet-metal screws. The main PCB 138 includes the components (see FIG. 3) for: the microcontroller 60; the GPS receiver module 80; the local wireless network master transceiver module 82; the cellular data transceiver module 84; the bulk memory module 86; the main voltage regulator 64; GPS digital voltage regulator 92; GPS analog/RF voltage regulator 94; the antennas 100, 106; and the Hall Effect Sensor 70. The cable assembly 140 connects the main PCB 138 to the battery PCB 136.

The battery PCB 136 includes the components for the fuel gauge circuit 66 (FIG. 3) and receives connections for the battery leads 142, the wires 122, 124 from the solar panel 110, and the cable assembly 140 from the main PCB 138. The battery PCB 136 is inserted into the battery PCB frame 148, and held in place by friction.

The battery 58 is placed in the battery compartment 146. The battery 58 is secured in the battery compartment 146 with a silicone or double-sided tape. The purpose of this step is temporary and is intended only to keep it in place when the electronics housing 112 is flipped upside down and placed onto the baseplate 114.

The cable assembly 140 connects the main PCB 138 to the battery PCB 136. The battery leads 142 connect the battery 58 to the battery PCB 136. The two wires 122, 124 from the solar panel 110 connect the solar cells 50 to the battery PCB 136.

The baseplate member 114 serves to connect the solar panel 110 and provide a watertight pathway into the electronics housing 112 for the two wires 122, 124 from the solar panel 110. The baseplate member 114 has a gasket channel 152 adjacent to its perimeter.

In the assembly process, a gasket 154, preferably of rubber, is placed in the gasket channel 152. The small round second grommet 132 on the wires 122, 124 is inserted into the cable way 150 that helps keep the wires 122, 124 in place. The electronics housing 112 is then flipped upside down and placed on the baseplate member 114. The electronics housing 112 is attached to the baseplate member 114 using fasteners, such as screws and nuts. Threadlocker is used on the screws to help secure the screws in place. Adhesive members 156a-156f, such as a VHB tape, are attached to the bottom of the baseplate member 114 and the base sheet 118 of the solar panel 110 for attaching the master control unit 14 to an outside surface, such as a roof 28, of a shipping container 12 (FIG. 2).

Also, prior to installation on a shipping container 12 (FIG. 2) the magnet 72 is placed in a magnet recess 158 formed on the bottom of the baseplate member 114, as described above.

Returning now to FIG. 3, in normal operation, the solar cells 50 will maintain the battery 58 in a charged condition, and the battery will operate the master control unit 14 during periods where the solar panel 110 does not generate power. In the event that the master control unit 14 were shielded from sunlight, however, the microcontroller 60 will operatively shut down components of the master control unit 14 to conserve power. For instance, if the storage level of the battery 58 drops below a first predetermined threshold (e.g. 25%), the microcontroller 60 will turn off the cellular data transceiver module 84 except when the master control unit 14 needs to transmit data to the central tracking computer 20 (FIG. 1). If the storage level of the battery 58 further drops below a second predetermined threshold (e.g. 10%), the microcontroller 60 will continue to monitor the storage level from a "deep sleep" state, but turn all other elements of the master control unit 14 off. When charging resumes, the microcontroller 60 will wait until the battery 58 is charged to above the first predetermined threshold before it turns the other elements of the master control unit 14 back on.

Thus, the integral, one-piece master control unit 14 may be attached to an outside surface of a shipping container 12, collect data wirelessly from wireless sensors located within the shipping container 12 without any holes or penetrations through the skin of the shipping container, and transmit the data to the tracking database 22 of a central tracking computer 20 via a cellular data network 16 and the Internet 18, for access by various internet access appliances 24 over the Internet 18 (FIG. 1).

One of ordinary skill in the art will recognize that additional steps and configurations are possible without departing from the teachings of the invention. This detailed description, and particularly the specific details of the exemplary embodiment disclosed, is given primarily for clearness of understanding and no unnecessary limitations are to be understood therefrom, for modifications will become evident to those skilled in the art upon reading this disclosure and may be made without departing from the spirit or scope of the claimed invention.

What is claimed is:

1. A device for attaching to an outside surface of a shipping container for tracking the shipping container, comprising:
    a solar panel for converting light-energy into electrical power;
    a battery for receiving and storing said electrical power from said solar panel;
    a GPS receiver module for receiving signals from a global positioning system and determining a location of said shipping container;
    a cellular data transceiver module for communicating via a cellular data network;
    a microcontroller for controlling said GPS receiver module and said cellular data transceiver module to periodically obtain said location of said shipping container from said GPS receiver module, and to transmit said location using said cellular data transceiver module;
    wherein said solar panel, said battery, said GPS receiver module, said cellular data transceiver module, and said microcontroller are integrated into a master control unit attached to an outside surface of the shipping container without penetrating into an interior of the shipping container
    a local wireless network master transceiver module integrated into said master control unit, said local wireless network master transceiver module having a transceiver for wirelessly communicating with a wireless sensor located within said shipping container through walls of the shipping container without any holes through the walls of the shipping container, said microcontroller further for controlling said local wireless network master transceiver module to periodically obtain data from said wireless sensor, and transmit said data using said cellular data transceiver module;

a battery charging circuit integrated into said master control unit, said battery charging circuit being controlled by said microcontroller for charging said battery with said electrical power from said solar panel; and a fuel gauge circuit integrated into said master control unit, said fuel gauge circuit for communicating a power level of the battery to the microcontroller, said microcontroller turning off said cellular data transceiver module except when the device needs to transmit data when the power level of the battery drops below a first predetermined threshold, said microcontroller further turning off said GPS receiver module and said local wireless network master transceiver module when the power level of the battery drops below a second predetermined threshold.

2. The device of claim 1, wherein said master control unit further includes a baseplate member attached to said solar panel, and an electronics housing sealed to said baseplate member, said electronics housing containing said battery, said GPS receiver module, said cellular data transceiver module, and said microcontroller.

3. The device of claim 2, said solar panel further comprising a solar film having power output contacts, said solar film positioned on a rigid base sheet, said rigid base sheet attached to said baseplate member.

4. The device of claim 3, further comprising a Hall-effect sensor in communication with said microcontroller, and a magnet, said baseplate member further comprising a recess for receiving said magnet, said microcontroller sensing a presence of the magnet via the Hall-effect sensor to turn the device on.

5. The device of claim 4, further comprising an adhesive member attached to bottom surfaces of said baseplate member and said solar panel for attaching said device to an outside surface of said shipping container.

6. A method of tracking information about a shipping container having walls that form a substantially sealed enclosure, said method comprising:

positioning a master control unit on the outside of the shipping container without penetrating the walls of said shipping container, said master control unit:
  converting light-energy into electrical power using a solar panel;
  storing said electrical power from said solar panel in a battery;
  receiving signals from a global positioning system and determining a location of said shipping container using a GPS receiver module;
  communicating with a cellular data network using a cellular data transceiver module;
  controlling said GPS receiver module, and said cellular data transceiver module with a microcontroller to periodically obtain said location of said shipping container from said GPS receiver module, and transmit said location using said cellular data transceiver module;
  receiving a power level of the battery from a fuel gauge circuit;
  turning off the cellular data transceiver module except when the master control unit needs to transmit data when the power level of the battery drops below a first predetermined threshold; and
  turning off the GPS receiver module and the local wireless network master transceiver module when the power level of the battery drops below a second predetermined threshold.

7. The method of claim 6, further comprising:
positioning a wireless sensor within said shipping container without penetrating the walls of said shipping container, said wireless sensor for sensing a condition of said shipping container;
said master control unit further:
  communicating with said wireless sensor through the walls of the shipping container without any holes through the walls using a local wireless network master transceiver module; and
  controlling said local wireless network master transceiver module to periodically obtain sensor data from said wireless sensor, and transmit said sensor data using said cellular data transceiver module.

8. The method of claim 7, further comprising pairing said wireless sensor with said local wireless network master transceiver module, said local wireless network master transceiver module communicates only with said paired wireless sensor.

* * * * *